United States Patent
Jernakoff et al.

(10) Patent No.: US 11,279,806 B2
(45) Date of Patent: *Mar. 22, 2022

(54) PREPARATION OF LACING RESISTANT, TITANIUM DIOXIDE PARTICLES FOR USE IN PHOTODURABLE THIN FILM PRODUCTION

(71) Applicant: THE CHEMOURS COMPANY FC, LLC, Wilmington, DE (US)

(72) Inventors: Peter Jernakoff, Wilmington, DE (US); John Davis Bolt, Kingston, TN (US)

(73) Assignee: THE CHEMOURS COMPANY FC, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/923,147

(22) Filed: Jul. 8, 2020

(65) Prior Publication Data

US 2020/0332074 A1    Oct. 22, 2020

Related U.S. Application Data

(60) Continuation of application No. 16/100,254, filed on Aug. 10, 2018, now Pat. No. 10,745,529, which is a division of application No. 14/930,731, filed on Nov. 3, 2015, now Pat. No. 10,106,657.

(60) Provisional application No. 62/076,158, filed on Nov. 6, 2014.

(51) Int. Cl.
| | | |
|---|---|---|
| *C08J 3/22* | (2006.01) | |
| *C09C 1/36* | (2006.01) | |
| *C08K 9/02* | (2006.01) | |
| *C08K 9/06* | (2006.01) | |
| *C08K 9/10* | (2006.01) | |
| *C08J 5/18* | (2006.01) | |
| *C08K 3/22* | (2006.01) | |

(52) U.S. Cl.
CPC . *C08J 3/22* (2013.01); *C08J 5/18* (2013.01); *C08K 9/02* (2013.01); *C08K 9/06* (2013.01); *C08K 9/10* (2013.01); *C09C 1/3661* (2013.01); *C09C 1/3684* (2013.01); *C09C 1/3692* (2013.01); *C01P 2004/62* (2013.01); *C01P 2004/64* (2013.01); *C08J 2323/06* (2013.01); *C08K 2003/2241* (2013.01)

(58) Field of Classification Search
CPC . C08J 3/22; C08J 5/18; C08J 2323/06; C08K 9/10; C08K 9/02; C08K 2003/2241; C09C 1/3661; C09C 1/3684; C09C 1/3692; C01P 2004/62; C01P 2004/64
USPC .......................................................... 523/210
See application file for complete search history.

(56) References Cited

U.S. PATENT DOCUMENTS

| | | |
|---|---|---|
| 4,460,655 A | 7/1984 | Jacobson |
| 5,137,575 A | 8/1992 | Yasuki et al. |
| 5,607,994 A | 3/1997 | Tooley et al. |
| 5,631,310 A | 5/1997 | Tooley et al. |
| 5,889,090 A | 3/1999 | Tooley et al. |
| 5,959,004 A | 9/1999 | Tooley et al. |
| 5,993,533 A | 11/1999 | Diebold et al. |
| 6,126,915 A | 10/2000 | Tunashima |
| 7,662,359 B2 | 2/2010 | Karvinen et al. |
| 10,106,657 B2 | 10/2018 | Jernakoff |
| 10,745,529 B2 * | 8/2020 | Jernakoff ................... C08J 3/22 |
| 2005/0135994 A1 | 6/2005 | Frerichs |
| 2005/0232851 A1 | 10/2005 | Prochazka et al. |
| 2006/0026329 A1 | 2/2006 | Yu |
| 2006/0090672 A1 * | 5/2006 | Lu .......................... C09C 1/3653 |
| | | 106/447 |

FOREIGN PATENT DOCUMENTS

| | | |
|---|---|---|
| CN | 1789143 A1 | 6/2006 |
| CN | 102161506 A1 | 7/2012 |
| EP | 0401045 B1 | 1/1995 |
| EP | 1726625 | 11/2006 |
| GB | 1179171 | 1/1970 |
| WO | 2005049496 A2 | 6/2005 |
| WO | 2005075354 A2 | 8/2005 |
| WO | 2008/030311 | 3/2008 |
| WO | 2010106146 A1 | 9/2010 |

OTHER PUBLICATIONS

D. Holtzen, P. Niedenzu, M. Diebold, "TiO2 Photochemistry and Color Applications", Society of Plastics Engineers' 2001 Annual Technical Conference Proceedings.

International Search Report issued in PCT/US2015/058712 dated Feb. 2, 2016.

* cited by examiner

*Primary Examiner* — Hannah J Pak

(57) ABSTRACT

A process is provided for the preparation of lacing resistant, titanium dioxide particles for use in photodurable thin film production. Said process involves dewatering titanium dioxide particles that have been encapsulated with a layer of amorphous alumina in continuous fashion at temperatures in excess of 100° C.

5 Claims, No Drawings

PREPARATION OF LACING RESISTANT, TITANIUM DIOXIDE PARTICLES FOR USE IN PHOTODURABLE THIN FILM PRODUCTION

This application is a continuation of Ser. No. 16/100,254, filed Aug. 10, 2018, now allowed, which is a divisional application of U.S. Ser. No. 14/930,731 filed Nov. 3, 2015, which claims priority of U.S. Provisional Application No. 62/076,158 filed Nov. 6, 2014.

FIELD OF THE INVENTION

Disclosed are methods for the efficient production of lacing resistant titanium dioxide particles that can be used to produce thin films that possess photodurable properties.

BACKGROUND OF THE INVENTION

Titanium dioxide particles of the rutile or anatase crystalline form possess a well-known characteristic ability to absorb light in the ultraviolet (UV) wavelength range, a process that generates metastable electron poor and electron rich regions within the particle structure. If the surfaces of said particles are not suitably modified, the interaction of water and/or oxygen with said regions results in the generation of highly reactive, oxygen atom-based radical species that can over time degrade the appearance and/or the physical properties of many of the thermoplastic polymer matrices into which the aforementioned particles might be incorporated (see D. Holtzen, P. Niedenzu, M. Diebold, "TiO2 Photochemistry and Color Applications", Society of Plastics Engineers' 2001 Annual Technical Conference Proceedings). Put differently, unless suitably modified, the UV light induced photoactivity of titanium dioxide particles for the most part prevents their use for the manufacture of thermoplastic polymer derived articles that require a commercially useful level of photodurability. Common examples of thermoplastic polymer matrices that are typically affected by this problem include, but are not limited to, those based on polyethylene, polypropylene and polyvinyl chloride.

A surface modification technique that is most often utilized during the commercial production of titanium dioxide particles to effectively mitigate the aforementioned photoactivity involves the encapsulation of said particles in a layer of amorphous silica which is then followed by the deposition of crystalline alumina of boehmite or boehmite-like morphology. An example of such a particle encapsulation process is taught in U.S. Pat. No. 5,993,533. The amorphous silica portion of this type of particle treatment is typically present at levels that range from about 1 wt % to about 10 wt % (total particle basis) while the crystalline alumina portion of said treatment is typically present at levels that range from about 1 wt % to about 5 wt % (total particle basis).

Another surface modification technique that can be employed to significantly mitigate the undesirable photoactivity of titanium dioxide particles involves encapsulating them in a layer of only amorphous alumina. An example of such a particle encapsulation process is taught in Example 1 of U.S. Pat. No. 4,460,655. In this process, fluoride ion, typically present at levels that range from about 0.05 wt % to 2 wt % (total particle basis), is used to disrupt the crystallinity of the alumina, typically present at levels that range from about 1 wt % to about 8 wt % (total particle basis), as the latter is being deposited onto the titanium dioxide particles. Note that other ions that possess an affinity for alumina such as, for example, citrate, phosphate or sulfate can be substituted in comparable amounts, either individually or in combination, for the fluoride ion in this process.

A significant disadvantage of the amorphous silica/crystalline alumina and the amorphous alumina-only particle encapsulation strategies is that the resulting particle encapsulations are prone to water retention and/or latent water generation. These tendencies can lead to the release of water vapor when the so-encapsulated titanium dioxide particles are incorporated into thermoplastic polymer derived articles using elevated temperatures. Such a release can unfortunately result in the formation of commercially unacceptable defects in the article that is being produced. When the article that is being produced is in thin film form, undesirable thin spots and/or holes can be produced in the film as it is being extruded, a process that is typically referred to as lacing.

SUMMARY OF THE INVENTION

Surprisingly, it has been found that the lacing resistance of amorphous alumina-only encapsulated titanium dioxide particles can be increased to a commercially useful level by simply dewatering said particles in continuous fashion using readily available particle drying equipment at a temperature greater than 100° C., most preferably, from 200° C. to 500° C., a behavior that was not observed when amorphous silica/crystalline alumina encapsulated titanium dioxide particles were subjected to a similar dewatering treatment. Importantly, the ability of the amorphous alumina-only encapsulated titanium dioxide particles to resist the generation of oxygen based radical species when exposed to UV light radiation is not compromised by application of the dewatering process.

One embodiment of the present invention is a method of making lacing resistant, low photoactivity titanium dioxide particles comprising the steps of: a) providing titanium dioxide particles encapsulated with amorphous alumina; and b) heating the titanium dioxide particles encapsulated with amorphous alumina to a temperature above 100° C. to form dewatered particles. The titanium dioxide particles may also be heated to a temperature in the range of 200° C. to 500° C. The titanium dioxide particles produced from this process may undergo an additional step of treating the surface of the dewatered particles with an organic compound selected from the group consisting of low molecular weight polyols, organosiloxanes, organosilanes, alkylcarboxylic acids, alkylsulfonates, organophosphates, organophosphonates and mixtures thereof. The preferred organic compound is selected from the group consisting of low molecular weight polyols, organosiloxanes, organosilanes and organophosphonates and mixtures thereof and the organic compound is present at a loading of between 0.20 wt % and 2.00 wt % on a total particle basis.

Another embodiment of the present invention is a method of making a masterbatch comprising the steps of: a) providing titanium dioxide particles encapsulated with amorphous alumina; b) heating the titanium dioxide particles encapsulated with amorphous alumina to a temperature above 100° C. to form dewatered particles or preferably to a temperature in the range of 200° C. to 500° C.; c) treating the surface of the dewatered particles with an organic compound to form treated particles; and d) mixing the treated particles with a thermoplastic polymer to make a masterbatch.

Another embodiment of the present invention is a method of making an article comprising the steps of: a) providing titanium dioxide particles encapsulated with amorphous alumina; b) heating the titanium dioxide particles encapsulated with amorphous alumina to a temperature above 100° C. to form dewatered particles; c) treating the surface of the dewatered particles with an organic compound to form treated particles; d) mixing the treated particles with a thermoplastic polymer to make a masterbatch; e) mixing the masterbatch with additional thermoplastic polymer; and f) forming an article. The article may be a film having a thickness from 7 microns to 200 microns, preferably from 7 microns to 50 microns.

Another embodiment of the present invention is a composition of matter comprising titanium dioxide particles encapsulated with amorphous alumina wherein said particles possess a water content of 0.65 wt % or less on a total particle basis.

Another embodiment is a composition comprising: a) titanium dioxide particles encapsulated with amorphous alumina wherein said particles possess a water content of 0.65 wt % or less on a total particle basis; and
b) a thermoplastic polymer. The composition preferably is a masterbatch or a film.

DETAILED DESCRIPTION OF THE INVENTION

Applicants specifically incorporate the entire content of all cited references in this disclosure. Further, when an amount, concentration, or other value or parameter is given as either a range, a preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Titanium dioxide particles that are suitable for this invention are those that possess the following: most preferably, no organic surface treatment; an average particle size of about 20 nanometers to about 1000 nanometers, preferably from about 100 nanometers to about 750 nanometers and more preferably from about 200 nanometers to about 500 nanometers; the anatase or rutile crystalline form; and one or more particle encapsulating layers of amorphous alumina without said particles being pre-encapsulated with silica.

The dewatering process can be efficiently performed by passing the titanium dioxide particles suitable for this invention in continuous fashion through a pre-heated, gravity discharge, non-contact rotary calciner such as those produced by Heyl & Patterson's Renneburg Division (Pittsburgh, Pa.). Calciners of this type typically employ a counter-current air flow to remove volatilized water and can be heated electrically, with steam or via the use of a heated liquid medium such as oil. An adjustable rate pigment feeding mechanism at the entrance to the calciner and an adjustable dam at the outlet of the calciner in tandem provide a means to alter the residence time of pigment within the calciner so as to provide for the desired degree of pigment dewatering for a given operating temperature. For the latter parameter, preferred temperatures include those greater than 100° C. and, most preferably, those from 200° C. to 500° C.

The dewatered amorphous alumina encapsulated titanium dioxide particles produced by the method of this invention possess a water content (total particle basis) of 0.65 wt % or less, more preferably 0.55 wt % or less and most preferably 0.50 wt % or less.

The dewatering process can also be performed in a batch calciner based unit operation but such a process is typically less cost-effective than using the continuous process described above.

Following the dewatering step, any organic based surface treatment can be added to the dewatered pigment particles at a loading (total particle basis) of between 0.05 and 5.00 wt %, more preferably between 0.10 wt % and 3.00 wt % and most preferably between 0.20 and 2.00 wt %, as long as said treatment does not contribute to the generation of the aforementioned lacing imperfections. The treatment of inorganic particles such as titanium dioxide with organic compounds is well known as a means to allow the efficient incorporation of said particles into polymer matrices at high loadings, at high processing rates and with a high degree of dispersion (see, for example, U.S. Pat. Nos. 5,607,994; 5,631,310; 5,889,090; and 5,959,004, the contents of which are incorporated herein by reference). Examples of organic compounds that can be used in this treatment step, either individually or in combination, include, but are not limited to, low molecular weight polyols, organosiloxanes, organosilanes, alkylcarboxylic acids, alkylsulfonates, organophosphates or organophosphonates.

By dewatered pigment particles, it is meant that said particles have lost water after undergoing the heating process of the current invention such that their lacing resistance is enhanced.

The dewatered pigment particles of the current invention, which may or may not possess an organic compound derived surface treatment, can be incorporated into a wide variety of thermoplastic polymers to make masterbatch which in turn can then be combined with additional thermoplastic polymer prior to making a final article of desired form. In the case of masterbatch production, the pigment and thermoplastic polymer can be combined using, for example, continuous mixer, batch mixer and twin screw extrusion production technologies. The combination of masterbatch and additional thermoplastic polymer can then be converted into a final desired article using, for example, cast film extrusion, blown film extrusion, slit film extrusion, sheet and profile extrusion, fiber and filament extrusion, film coating extrusion and wire coating extrusion technologies as well as injection molding, blow molding, blown film molding and rotational molding technologies.

By thermoplastic, it is meant that a polymer can be repeatedly manipulated in a processing step that involves obtaining the polymer in the molten state. The term masterbatch refers to a pigment and thermoplastic polymer combination that possesses a pigment loading of 50 wt % to 85 wt %, more preferably a pigment loading of 60 wt % to 75 wt %.

During the masterbatch and final shaped article production processes, additives known in the art to provide beneficial properties to the masterbatch and to said article such as, for example, antioxidants, light stabilizers, colorants, surface friction modifiers, lubricants, anti-blocking agents, anti-static agents or other pigments, can be incorporated as well, either individually or in combination, using techniques known in the art.

Thermoplastic polymers that can be used in the above mentioned production processes include, but are not limited to, the following: polymers derived from ethylenically unsaturated monomers including olefins such as polyethylene, polypropylene, polybutylene, and copolymers of ethylene with other olefins such as vinyl acetate or alpha olefins containing 4 to 10 carbon atoms; vinyls such as polyvinyl chloride; polyvinyl esters such as polyvinyl acetate; polystyrene; acrylonitrile-butadiene-styrene; acrylic homopolymers and copolymers; phenolic polymers and copolymers; alkyd and amino resins; epoxy resins, polyamides, polyurethanes; phenoxy resins, polysulfones; polycarbonates; polyesters and chlorinated polyesters; polyethers; acetal resins; polyimides; and polyoxyethylenes. Mixtures of polymers are also contemplated. Thermoplastic polymers suitable for use in the present invention also include various rubbers and/or elastomers and either natural or synthetic polymers based on copolymerization, grafting, or physical blending of various diene monomers with the above-mentioned polymers, all as generally known in the art. Typically, the thermoplastic polymer may be selected from the group consisting of polyolefin, polyvinyl chloride, polyamide, polyester and polycarbonate and mixtures thereof. More typically used thermoplastic polymers are polyolefins. Most typically used thermoplastic polymers are polyolefins selected from the group consisting of polyethylene, polypropylene and mixtures thereof. Typical polyethylene polymers are low density polyethylene and linear low density polyethylene.

While the compositions and methods of this invention have been described in terms of preferred embodiments, it will be apparent to those of skill in the art that variations may be applied to the compositions and methods and to the steps or to the sequence of steps of the method described herein without departing from the concept, spirit, and scope of the invention. More specifically, it will be apparent that certain agents which are chemically related may be substituted for the agents described herein while the same or similar results would be achieved. All such similar substitutes and modifications apparent to those skilled in the art are deemed to be within the spirit, scope, and concept of the invention as defined by the appended claims.

EXAMPLES

The present invention is further defined in the following Examples. It should be understood that these Examples, while indicating preferred embodiments of the invention, are given by way of illustration only. From the above discussion and these Examples, one skilled in the art can ascertain the preferred features of this invention and, without departing from the spirit and scope thereof, can make various changes and modifications of the invention to adapt it to various uses and conditions.

All of the inorganic and organic titanium dioxide particle surface treatment loadings provided in the below examples are on a total particle basis. The carbon content of the octyltriethoxysilane (OTES) treated pigment samples was determined using a LECO SC632 Analyzer. The moisture content of pigment samples that did not possess an OTES surface treatment were obtained using a Perkin Elmer TGA 7 Thermogravimetric Analyzer operating as follows:
1. Under flowing air (50 mL/minute), 10-20 mg of pigment sample is heated from room temperature to 316° C. at a 100° C./minute heating rate.
2. Said sample is then held at 316° C. for 30 minutes.
3. The total mass loss of said sample after completion of the hold period is then determined.

Example 1

Fifty kilograms of organic surface treatment free, pigmentary sized, titanium dioxide particles of the rutile crystalline phase that had been encapsulated with 1.8 wt % amorphous alumina according to the teaching of U.S. Pat. No. 4,460,655, the contents of which are incorporated herein by reference, otherwise known as the starting pigment, were dewatered in a Heyl and Patterson built, non-contact rotary calciner (heating zone tube dimensions: 7 feet long×0.54 feet wide, cooling zone tube dimensions: 3 feet long×0.54 feet wide; 2.5% calciner tube slope) using a counter-current air flow, a calciner temperature of 338° C. and a pigment residence time within said calciner of 5 minutes. Said calciner was rotated at about 5 rpm during the dewatering process. Thermogravimetric analysis of the dewatered pigment particles yielded a moisture content of 0.47 wt %.

Ten kilograms of the dewatered pigment particles were then placed into an aluminum foil lined metal pan and treated with neat octyltriethoxysilane (OTES) at a 1.0 wt % loading using a hand spryer. The OTES-treated pigment particles were then air dried at room temperature for 48 hours, homogenized in a V-cone blender and finally deagglomerated using an 8 inch steam micronizer at 290° C. using a steam-to-pigment ratio of 7-to-1. The resulting product was labeled as Sample A1 and possessed an OTES-derived carbon content of 0.298 wt %.

The OTES treatment and subsequent particle deagglomeration process was then repeated using a second 10 kilogram batch of dewatered pigment particles to give product that was labeled as Sample A2 and that possessed an OTES-derived carbon content of 0.312 wt %.

Example 2

Ten kilograms of the starting pigment utilized in Example 1 were treated with OTES and then deagglomerated using the same procedures as described in said Example to yield a final product that was labeled as Sample B1 and that possessed an OTES-derived carbon content of 0.288 wt %. Prior to the OTES addition, the starting pigment was found by thermogravimetric analysis to possess a moisture content of 1.12 wt %.

The OTES treatment and subsequent deagglomeration process was then repeated using a second 10 kilogram batch of starting pigment to give product that was labeled as Sample B2 and that possessed an OTES-derived carbon content of 0.319 wt %.

Comparative Example 3

Fifty five kilograms of organic surface treatment free, pigmentary sized, titanium dioxide particles of the rutile crystalline phase that had been sequentially encapsulated with 3.2 wt % amorphous silica and then with 1.9 wt % pseudo-boehmite alumina according to the teaching of U.S. Pat. No. 5,993,533, the contents of which are incorporated herein by reference, otherwise known as the starting pigment, were dewatered in a Heyl and Patterson built, non-contact rotary calciner (heating zone tube dimensions: 7 feet long×0.54 feet wide, cooling zone tube dimensions: 3 feet long×0.54 feet wide; 2.5% calciner tube slope) using a counter-current air flow, a calciner temperature of 330° C. and a pigment residence time within said calciner of 5 minutes. Said calciner was rotated at about 5 rpm during the dewatering process. Thermogravimetric analysis of the dewatered pigment particles yielded a moisture content of 0.65 wt %.

Ten kilograms of the dewatered pigment particles were then placed into an aluminum foil lined metal pan and treated with neat OTES at a 1.0 wt % loading using a hand spryer. The OTES-treated pigment particles were then air dried at room temperature for 48 hours, homogenized in a V-cone blender and finally deagglomerated using an 8 inch steam micronizer at 290° C. using a steam-to-pigment ratio of 7-to-1. The resulting product was labeled as Sample C1 and possessed an OTES-derived carbon content of 0.301 wt %.

The OTES treatment and subsequent deagglomeration process was then repeated using a second 10 kilogram batch of dewatered pigment particles to give product that was labeled as Sample C2 and that possessed an OTES-derived carbon content of 0.293 wt %.

Comparative Example 4

The dewatering procedure outlined in Comparative Example 3 was repeated with the following exception: another 55 kilograms of the starting pigment were passed through the rotary calciner but the calciner temperature employed was 410° C. The pigment residence time was still kept at 5 minutes. Thermogravimetric analysis of the resulting dewatered pigment particles yielded a moisture content of 0.50 wt %.

Ten kilograms of the dewatered pigment particles were then OTES-treated and deagglomerated using the same procedures as described in Comparative Example 3 to yield a final product that was labeled as Sample D1 and that possessed an OTES-derived carbon content of 0.227 wt %.

The OTES treatment and subsequent deagglomeration process was then repeated using a second 10 kilogram batch of dewatered pigment particles to give product that was labeled as Sample D2 and that possessed an OTES-derived carbon content of 0.308 wt %.

Comparative Example 5

Ten kilograms of the starting pigment utilized in Comparative Example 3 were treated with OTES and then deagglomerated using the same procedures as described in said Example to yield a final product that was labeled as Sample E1 and that possessed an OTES-derived carbon content of 0.296 wt %. Prior to the OTES addition, the starting pigment was found by thermogravimetric analysis to possess a moisture content of 0.99 wt %.

The OTES treatment and subsequent deagglomeration process was then repeated using a second 10 kilogram batch of starting pigment to give product that was labeled as Sample E2 and that possessed an OTES-derived carbon content of 0.302 wt %.

Example 6

Samples A1 through E1 were evaluated for their photoactivity behavior (750 exposure hours) using an in-house developed gloss retention test, the results from which are presented in Table 1. Said test involved individually compounding the above indicated samples as well as an OTES-treated, photoactive titanium dioxide based control pigment (one that did not possess a metal oxide derived particle encapsulation) into polyethylene (NA206, Equistar) using a batch internal mixer (Farrel Banbury® BR1600) at a 50 wt % pigment loading (76 vol % fill factor). After being mechanically ground into approximately ¼ inch (0.64 cm) pieces, the resulting masterbatches were then individually let down at 420° F. (216° C.) to a 10 wt % sample (or control pigment) loading with injection molding grade polypropylene (Montell PH-920S) using a Cincinnati-Milacron (Vista VT85-7) injection molder. The molder-produced 1% inch×3 inch×⅛ inch (4.45 cm×7.62 cm×0.32 cm) chips were analyzed for initial gloss (average of readings from the top, middle and bottom of the to-be-exposed side of each chip) using a Byk-Gardener Gloss-Haze meter. Said chips were then weathered in an Atlas Ci65A xenon Weather-Ometer® in accordance with ASTM Method G26-92 (Annual Book of ASTM Standards, Volume. 6.01, G26-92, 310-318, (1999)). To eliminate water spotting, water with a minimum resistance of 12 megaohms was used. At periodic intervals, the chips were removed from the Weather-Ometer®, dried, and re-analyzed for surface gloss, the loss of which results from the titanium dioxide pigment catalyzed photo-degradation of the chip polymer matrix. Reduced gloss retention equates with enhanced photoactivity.

TABLE 1

| Sample | $TiO_2$ Particle Encapsulation | Dewatering Conditions for Starting Pigment | OTES-Derived Carbon Content | % Gloss Retention after 750 Exposure Hours |
|---|---|---|---|---|
| Photoactive Control | None | Not dewatered | 0.305 wt % | 29 |
| A1 | Amorphous Alumina | 338° C. for 5 minutes | 0.298 wt % | 61 |
| B1 | Amorphous Alumina | Not dewatered | 0.288 wt % | 62 |
| C1 | Amorphous silica/ boehmite alumina | 330° C. for 5 minutes | 0.301 wt % | 72 |
| D1 | Amorphous silica/ boehmite alumina | 410° C. for 5 minutes | 0.227 wt % | 70 |
| E1 | Amorphous silica/ boehmite alumina | Not dewatered | 0.296 wt % | 72 |

A comparison of the gloss retention data for samples A1 and B1 reveals that the low photoactivity performance of the amorphous alumina encapsulated starting pigment was not compromised by the dewatering process. Comparing the gloss retention data for samples C1, D1 and E1 allows one to reach the same conclusion for the amorphous silica/boehmite alumina encapsulated starting pigment.

Example 7

Samples A2 through E2 were evaluated for their thin film lacing propensity along with lacing and non-lacing control samples using an in-house developed test, the results from which are presented in Table 2. The lacing control sample consisted of titanium dioxide particles produced according to Example 1 of U.S. Pat. No. 4,460,655, the contents of which are incorporated herein by reference, which were then treated with OTES. The non-lacing control sample consisted of OTES-treated titanium dioxide particles that did not possess a metal oxide derived particle encapsulation. Said test involved individually compounding the above indicated samples into polyethylene (NA206, LyondellBasell) using a batch internal mixer (Farrel Banbury® BR1600) at a 50 wt % pigment loading (76 vol % fill factor). The resulting pigment masterbatches were then mechanically ground into approximately ~¼ inch (0.64 cm) pieces which were then dried for 2-4 hours at 85° C. The dried and ground masterbatches were then individually combined by hand with low density polyethylene (NA345, LyondellBasell), which had also been dried for 2-4 hours at 85° C., to give mixtures with a 15 wt % sample loading. Each mixture was then converted into approximately 100 mm wide, 50 micron thick ribbons of pigmented polyethylene film using a Thermo Haake single screw extruder (Rheomex 252, 19.05 mm screw diameter, screw length/screw diameter=25) using barrel temperatures that ranged from 392° F. to 572° F. depending on barrel location and three different slit die temperatures, specifically 560° F., 580° F. and 600° F. After cooling, the extruded ribbons were then examined for signs of lacing using the below indicated visual rating scheme. Note that a 10+ rating is the most desired and that ratings below 10 are generally considered to be commercially unacceptable.

Lacing Visual Rating Scheme
10+→No indications of a pre-lacing condition (dark striations) or lacing (elongated thin spots or holes).
10→No elongated thin spots or holes, but pre-lacing signs are present.
8→Presence of a few very small elongated thin spots or holes.
6→Presence of numerous small elongated thin spots or holes.
4→Presence of numerous large elongated thin spots or holes.
2→Total film is covered with elongated holes.
0→Film break is caused by complete loss of film integrity.

lacing resistance (compare the lacing resistance performance for sample B2 to that of sample A2). More specifically, for the two lowest film extrusion temperatures evaluated (560° F. and 580° F.), the lacing resistance increase was sufficient (10+ final lacing rating) to allow the use of the dewatered pigment (after OTES treatment) for the production of, for example, lacing-free thin films.

Unexpectedly, however, the utilization of essentially the same dewatering conditions, viz. 5 minutes of heating at 330° C., as for the dewatering of sample B2 did not result in a significant improvement in the lacing resistance of sample E2 (compare the lacing resistance performance for sample E2 to that of sample C2). Surprisingly, the utilization of even more severe dewatering conditions, viz. 5 minutes of heating at 410° C., still did not impart to sample E2 a useful level of lacing resistance (compare the lacing resistance performance for sample E2 to that of sample D2).

We claim:
1. A method of making a masterbatch comprising the steps of:
 a) providing titanium dioxide particles encapsulated with amorphous alumina;
 b) heating the titanium dioxide particles encapsulated with amorphous alumina to a temperature above 100° C. to form dewatered particles;
 c) treating the surface of the dewatered particles with an organic compound to form treated particles; and
 d) mixing the treated particles with a thermoplastic polymer to make a masterbatch.
2. The method of claim 1 wherein the titanium dioxide particles are heated to a temperature in the range of 200° C. to 500° C.

TABLE 2

| Sample | TiO$_2$ Particle Encapsulation | Dewatering Conditions for Starting Pigment | OTES-Derived Carbon Content | Film Extrusion Temperature (Slit Die) (15 wt % TiO$_2$, 50 μm film thickness) | | |
|---|---|---|---|---|---|---|
| | | | | 560° F. (293° C.) | 580° F. (304° C.) | 600° F. (316° C.) |
| Non-Lacing Control | None | Not dewatered | 0.30 wt % | 10+ | 10+ | 10+ |
| Lacing Control | Amorphous Alumina | Not dewatered | 0.26 wt % | 6 | 4 | 1 |
| A2 | Amorphous Alumina | 338° C. for 5 minutes | 0.312 wt % | 10+ | 10+ | 7 |
| B2 (starting pigment) | Amorphous Alumina | Not dewatered | 0.319 wt % | 8 | 8 | 5 |
| C2 | Amorphous silica/boehmite alumina | 330° C. for 5 minutes | 0.293 wt % | 7 | 6 | 4 |
| D2 | Amorphous silica/boehmite alumina | 410° C. for 5 minutes | 0.308 wt % | 8 | 8 | 5 |
| E2 (starting pigment) | Amorphous silica/boehmite alumina | Not dewatered | 0.302 wt % | 7 | 6 | 3 |

Inspection of the data contained within Table 2 shows that starting pigment that is encapsulated with amorphous alumina and starting pigment that is encapsulated with amorphous silica/boehmite alumina, samples B2 and E2, respectively, both inherently possess poor lacing resistance. In the case of sample B2, the dewatering conditions utilized (5 minutes of heating at 338° C.) significantly increased its 3. The method of claim 1 wherein the organic compound is selected from the group consisting of low molecular weight polyols, organosiloxanes, organosilanes, alkylcarboxylic acids, alkylsulfonates, organophosphates, organophosphonates and mixtures thereof.

4. The method of claim 1 wherein the organic compound is selected from the group consisting of low molecular weight polyols, organosiloxanes, organosilanes and organophosphonates and mixtures thereof.

5. The method of claim 3 where the organic compound is present at a loading of between 0.20 wt % and 2.00 wt % on a total particle basis.

\* \* \* \* \*